(12) United States Patent
Shih

(10) Patent No.: US 8,311,676 B2
(45) Date of Patent: Nov. 13, 2012

(54) SYSTEM AND METHOD FOR CONTROLLING A BIPEDAL ROBOT VIA A COMMUNICATION DEVICE

(75) Inventor: Ruey-Ning Shih, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 974 days.

(21) Appl. No.: 12/324,853

(22) Filed: Nov. 27, 2008

(65) Prior Publication Data

US 2009/0287353 A1   Nov. 19, 2009

(30) Foreign Application Priority Data

May 16, 2008   (CN) .......................... 2008 1 0301611

(51) Int. Cl.
*G05B 19/04*   (2006.01)

(52) U.S. Cl. ........ 700/259; 700/245; 700/249; 700/250; 700/255; 700/258; 701/301; 701/409; 701/410; 701/532; 701/533; 318/568.12

(58) Field of Classification Search .......................... None
See application file for complete search history.

(56) References Cited

U.S. PATENT DOCUMENTS

| | | | | |
|---|---|---|---|---|
| 6,969,965 B2 * | 11/2005 | Takenaka et al. | ........ | 318/568.12 |
| 7,337,040 B2 * | 2/2008 | Takenaka et al. | ............. | 700/245 |
| 7,474,945 B2 * | 1/2009 | Matsunaga | ..................... | 701/25 |
| 7,873,438 B2 * | 1/2011 | Sekiya | ........... | 700/255 |
| 7,904,200 B2 * | 3/2011 | Takenaka et al. | ............ | 700/245 |
| 7,987,021 B2 * | 7/2011 | Takaoka | ........................ | 700/259 |
| 8,160,745 B2 * | 4/2012 | Sugiura | ........................ | 700/245 |
| 2004/0013295 A1 * | 1/2004 | Sabe et al. | ..................... | 382/153 |
| 2004/0233290 A1 * | 11/2004 | Ohashi et al. | ................. | 348/187 |
| 2005/0000543 A1 * | 1/2005 | Taylor et al. | ..................... | 134/18 |
| 2005/0126833 A1 * | 6/2005 | Takenaka et al. | ............. | 180/8.1 |
| 2005/0159879 A1 * | 7/2005 | De Graeve et al. | ........... | 701/200 |
| 2005/0182518 A1 * | 8/2005 | Karlsson | ....................... | 700/253 |
| 2006/0095160 A1 * | 5/2006 | Orita et al. | .................... | 700/248 |
| 2006/0155436 A1 * | 7/2006 | Matsunaga | ..................... | 701/23 |
| 2007/0156283 A1 * | 7/2007 | Takenaka | ...................... | 700/245 |
| 2008/0202202 A1 * | 8/2008 | Ueda et al. | .......................... | 73/9 |
| 2008/0319661 A1 * | 12/2008 | Werner et al. | ................. | 701/211 |

FOREIGN PATENT DOCUMENTS

| CN | 1617170 A | 5/2005 |
|---|---|---|
| CN | 2754288 Y | 1/2006 |

* cited by examiner

*Primary Examiner* — Khoi Tran
*Assistant Examiner* — Jonathan L Sample
(74) *Attorney, Agent, or Firm* — Altis Law Group, Inc.

(57) ABSTRACT

A system for controlling a bipedal robot via a communication device. The system acquires a mapping data and a current location of the bipedal robot via a Global Positioning System (GPS), determines a route on the mapping data, and directs movement of the bipedal robot until it reaches a preset destination. A method for controlling the robot and a storage device containing computer instructions for execution of the method are also provided.

14 Claims, 7 Drawing Sheets

SYSTEM AND METHOD FOR CONTROLLING A BIPEDAL ROBOT VIA A COMMUNICATION DEVICE

BACKGROUND

1. Field of the Invention

Embodiments of the present disclosure are related to movement control, and particularly to a system and method for controlling a bipedal robot via a communication device.

2. Description of Related Art

Robots are artificial devices primarily designed for automatically executing tasks. The robots are widely employed for replacing human beings or assisting humans in dangerous, dirty, or dull work such as in assembling and packing, transportation, earth exploration, and mass production of commercial and industrial goods. Additionally, the robots may execute tasks according to real-time human commands, preset software programs, or principles set with aid of artificial intelligent (AI) technologies.

To scientists and engineers in robotics, planning of a robot travel path is a major issue, requiring accurate navigation through a preset path, straight or curved. Currently, travelling robots can be either wheeled or bipedal. Since wheels have been employed in transportation vehicles for a long time, it is simpler and more economic to control movements of the wheeled robots. Comparatively, the bipedal robots provide better energy efficiency. Nonetheless, currently, bipedal robots traverse smooth surfaces, and easily fall in varied surrounding area. Additionally, due to control limitations, the bipedal robots may only be controlled over short distances.

Therefore, what is needed is a system and method for effective remote control of bipedal robots via a communication device.

DETAILED DESCRIPTION OF CERTAIN INVENTIVE EMBODIMENTS

Figure 2:
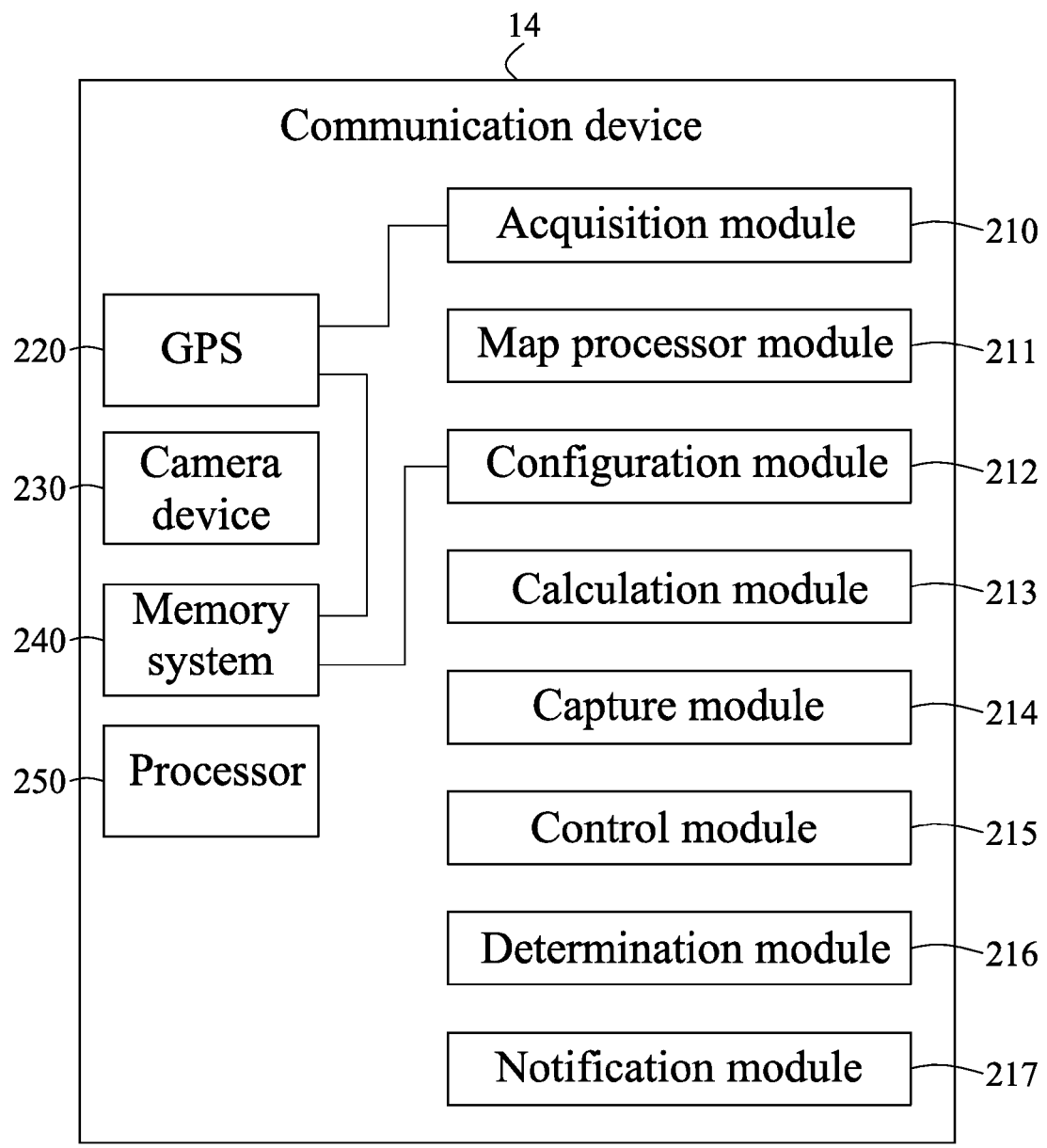
FIG. 2 is a block diagram of function modules of the communication device in FIG. 1.

All of the processes described may be embodied in, and fully automated via, software code modules executed by one or more general purpose computers or processors as depicted in FIG. 2. The code modules may be stored in any type of computer-readable medium or other storage device. Some or all of the methods may alternatively be embodied in specialized computer hardware or communication apparatus.

Figure 1:
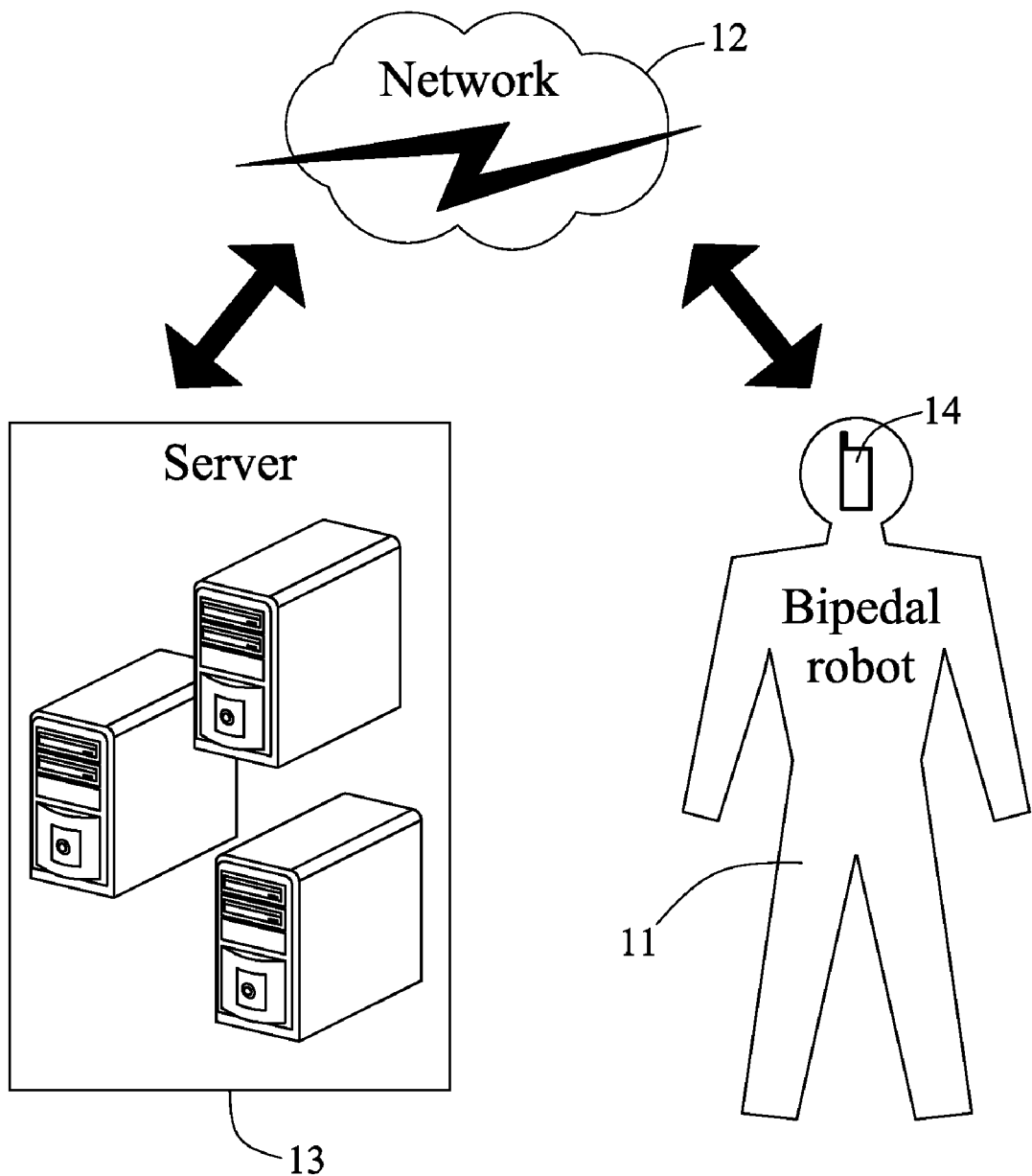
FIG. 1 is a schematic diagram of a system for controlling a bipedal robot via a communication device.

FIG. 1 is a schematic diagram of a system for controlling a bipedal robot 11 via a communication device 14. The system includes a bipedal robot 11, a network 12, and a server 13. The communication device 14 is embodied in the bipedal robot 11. The communication device 14 communicates with the server 13 via the network 12. In the embodiment, control of the communication device 14 via the network 12 from the server 13 directs movement of the bipedal robot 11, and also gathers data via the bipedal robot 11. The data gathered via the bipedal robot 11 may be real-time visual data, audio data, or any other kind of measurable data. Additionally, the bipedal robot 11 has two mechanical legs with one contact foot on each.

The network 12 is a wireless communication network, and may be a Global System for Mobile communications (GSM) network, a Universal Mobile Telecommunication System (UMTS) network, or any other kind of wireless data communication network.

The server 13 communicates with the communication device 14 via the network 12. The communication device 14 may be a mobile phone, a computer, or a personal digital assistant (PDA).

FIG. 2 is a block diagram of the communication device 14 in FIG. 1, including a Global Positioning System (GPS) 220 and a camera device 230. The GPS 220 is configured for determining a current location of the bipedal robot 11. The camera device 230 is configured for capturing visual data of a surrounding area through which the bipedal robot 11 is to travel. In other embodiments, the camera device 230 may be embedded in the bipedal robot 11.

The communication device 14 includes an acquisition module 210, a map processor module 211, a configuration module 212, a calculation module 213, a capture module 214, a control module 215, a determination module 216, a notification module 217, a memory system 240, and a processor 250. Additionally, the communication device 14 may include one or more specialized or general purpose processors such as the processor 250 for executing the modules 210, 211, 212, 213, 214, 215, 216, and 217.

The acquisition module 210 is configured for acquiring mapping data of the surrounding area through which bipedal robot 11 is to travel. The mapping data may be pre-stored in the memory system 240 of the communication device 14, and the acquisition module 210 may directly access the mapping data from the memory system 240. The memory system 240 may be a hard disk drive, a flash drive, or any other kind of memory storage system. Additionally, the acquisition module 210 may also acquire a schematic diagram of the mapping data from the Internet via the network 12. In one embodiment, the mapping data may include a diameter or a radius of the surrounding area around the bipedal robot 11. In one exemplary embodiment, the mapping data comprises a map. For the purpose of simplification, the word "map" may be used interchangeably with mapping data.

Figure 4:
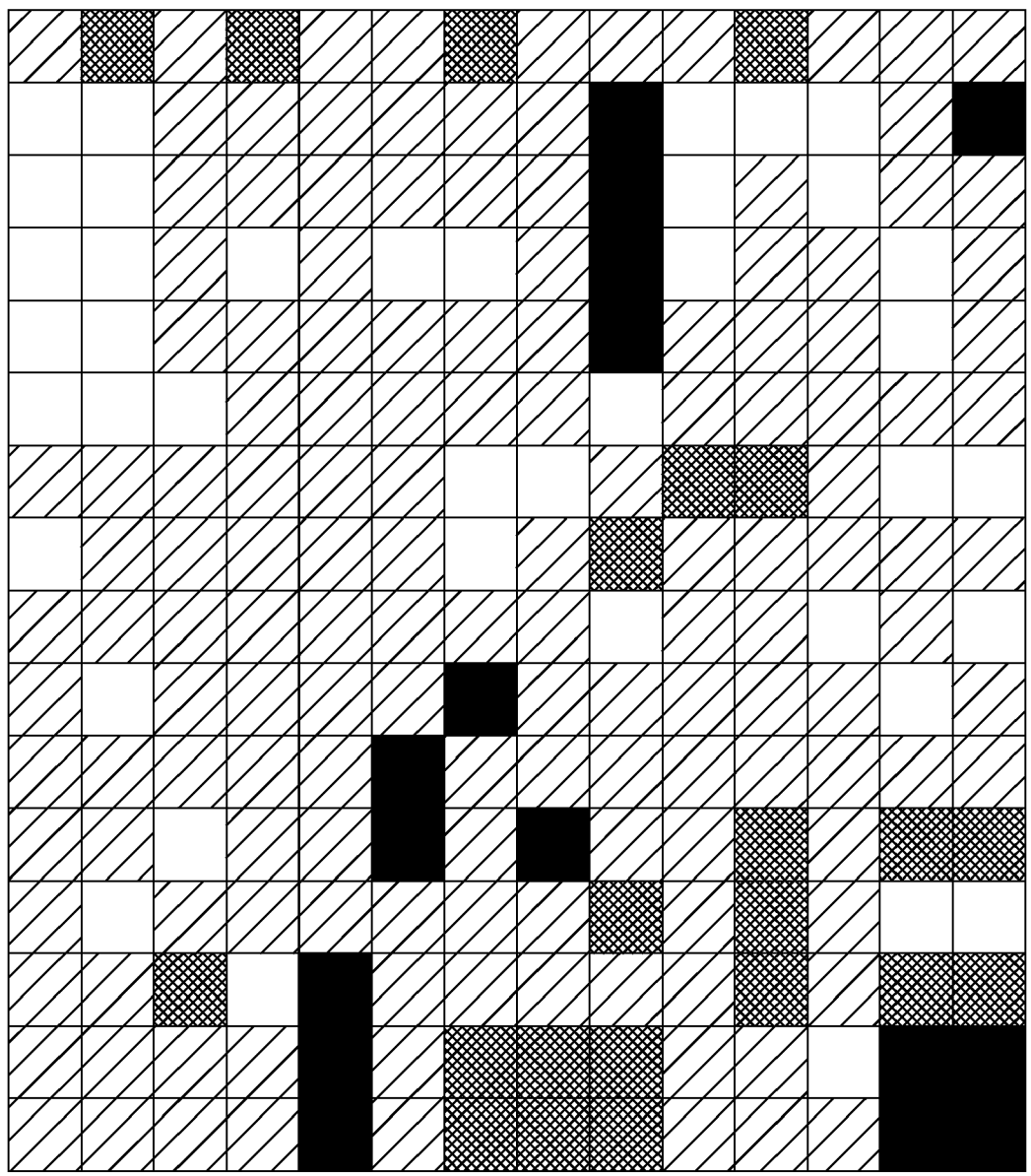
FIG. 4 is a schematic diagram of one embodiment of a processed map of the system in FIG. 1.

The map processor module 211 is configured for digitally processing the map acquired by the acquisition module 210. Digital processing applied may include conversion of the map to black and white, application of gridlines according to original resolution of the map, and determining a grayscale value of each grid through averages thereof. FIG. 4 is a schematic diagram of one embodiment of a map that has been processed by the map processor module 211.

Figure 5:
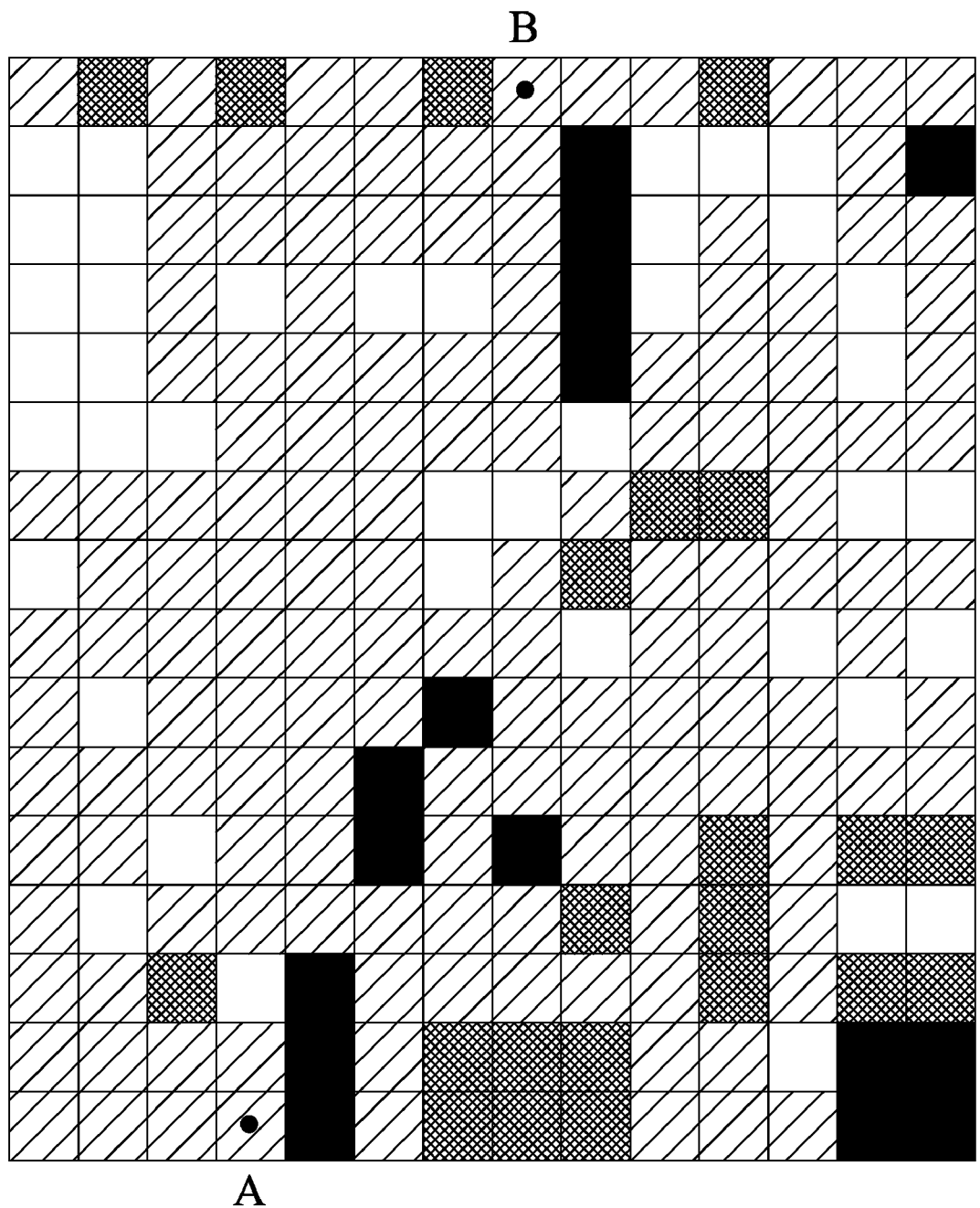
FIG. 5 is a schematic diagram of an exemplary current location and a destination location for the bipedal robot

The acquisition module 210 is also configured for acquiring the current location of the bipedal robot 11 on the map. FIG. 5 is a schematic diagram of an exemplary current location and a destination location for the bipedal robot 11. As shown in FIG. 5, a point A is the current location of the bipedal robot 11 on the map, and a point B is the destination location of the bipedal robot 11 on the map.

The configuration module 212 is configured for receiving and setting the destination location of the bipedal robot 11 on the map.

Figure 6:
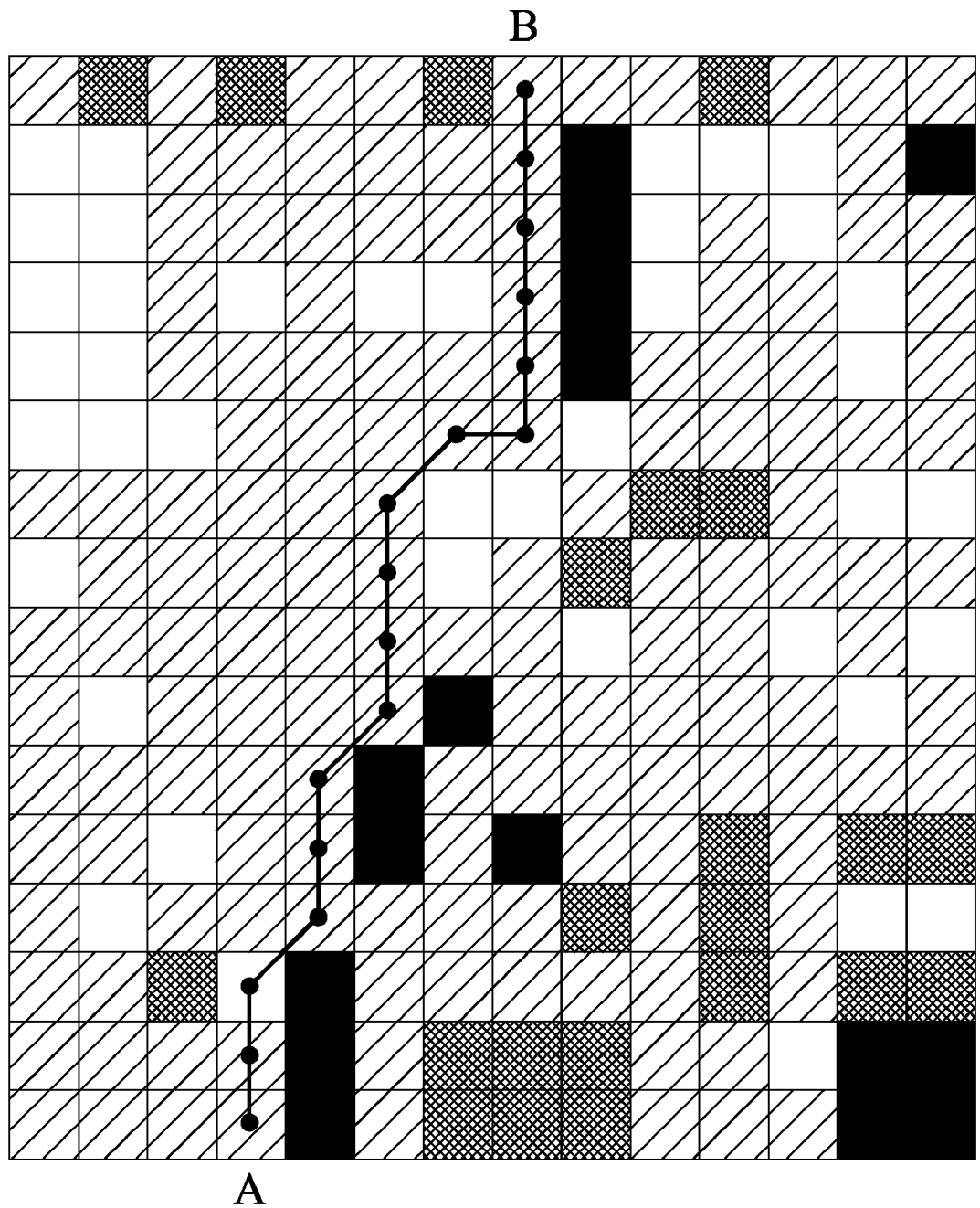
FIG. 6 is a schematic diagram of one embodiment of a route in the processed map of FIG. 5.

The calculation module 213 determines a route from the current location to the destination location according to the map, as well as all contact surfaces upon which the bipedal robot 11 steps according to the route. Here, contact surfaces are locations upon which the bipedal robot 11 may step by either a right contact foot or a left contact foot along the route. In this embodiment, the route is determined according to the average grayscale value of each grid on the map. FIG. 6 is a schematic diagram of one embodiment of a route which the bipedal robot 11 may take to reach point B from point A. The route is the shortest distance between points A and B, and includes criterion of each neighboring grid having closest grayscale values along the route.

In this embodiment, the contact surfaces are determined according to the route, the distance between contact feet of the bipedal robot 11, and the size of each contact foot. A location of each contact foot, a location of the left contact foot and a location of the right contact foot, may be within a buffering range, a fixed separation distance between a location of the left contact foot and a location of the right contact foot, along the route. Additionally, the neighboring step distance of the left contact foot and the right contact foot may be less than the maximum range across which the bipedal robot 11 may walk by only one step.

The capture module 214 is configured for capturing visual data, via the camera device 230, of the surrounding area into which the bipedal robot 11 is about to move. For example, the capture module 214 may capture a tree or a person around the bipedal robot 11.

The map processor module 211 is also configured for digitally processing the visual data of the surrounding area into which the bipedal robot 11 is about to move. Here, the digital processing applied on the visual data of the surrounding area around the contact surface of the next step includes converting the visual data of the surrounding area of the contact foot of the next step to black and white, application of gridlines onto the map of the surrounding area according to original resolution of the visual data, and determining a grayscale value of each grid by averaging values of the grid.

The calculation module 213 is also configured for determining an angle of the contact foot of each step which the bipedal robot 11 is about to take according to the visual data of the surrounding area around the contact surface of the next step. The angle of the contact foot of the next step is determined according to the grayscale values of each grid on the visual data of the surrounding area. For example, firstly, the calculation module 213 determines an average of grayscale values in a first half of the grid, and an average in the second half. Secondly, the calculation module 213 determines an inclined angle of the surrounding area of the contact surface according to a difference between the average of grayscale values in first half of a grid and the average in second half of the grid. Thirdly, the calculation module 213 determines the angle of the contact foot of the next step according to the inclined angle. For example, the inclined angle may be 25°. Depending on embodiments, the inclined angle may be other than 25°.

The control module 215 is also configured for directing the bipedal robot to move from the current location to the destination location according to the determined contact surfaces and according to the determined route. The control module 215 is also configured for controlling the bipedal robot 11 move to the contact surface of the next step according to the angle of the contact foot of the next step. In this embodiment, the contact surface of the next step includes the location of the left contact foot and the location of the right contact foot. If the next step is determined to move the left contact foot, the control module 215 directs the bipedal robot 11 to move a left leg to next contact surface. In a similar way, if the next contact foot is determined to move the right contact foot, the control module 215 directs the bipedal robot 11 to move a right leg to the next contact surface. Additionally, the server 13 may direct the bipedal robot 11 to feedback real-time data such as visual, audio, or other kind of measurement data according to the current situation after the control module 215 directs the bipedal robot 11 to move to the next contact surface.

The determination module 216 is configured for determining if movement to a location of the next surface was successful, and if the bipedal robot 11 has reached the destination location. Additionally, the control module 215 continues directing the bipedal robot 11 to move to the next contact surface until the bipedal robot 11 reaches the destination location according to determination information provided from the determination module 216.

The notification module 217 is configured for issuing emergency signals to the server 13 if the bipedal robot 11 does not successfully move to the next contact surface. For example, the bipedal robot 11 may be configured to search for landmines, if the bipedal robot 11 touches the landmines and gets damaged, the bipedal robot 1 may transmit important real-time data about the field back to the server 13, and send the emergency signals to the server 13 via the notification module 217. An example of the bipedal robot 11 directed by the communication device 14 follows.

Figure 3A:
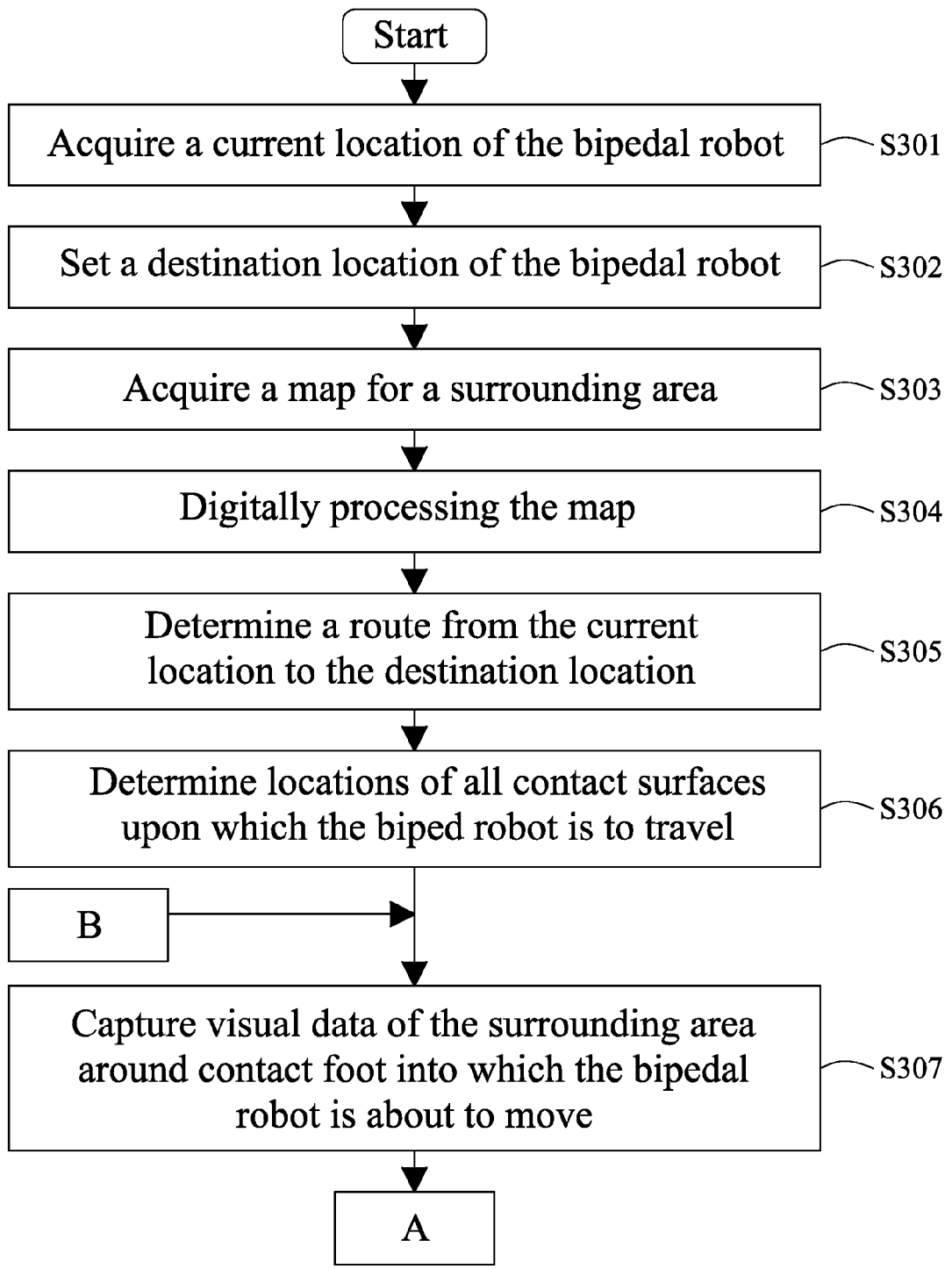
FIG. 3 is a flowchart of a method for controlling a bipedal robot via a communication device.
Figure 3B:
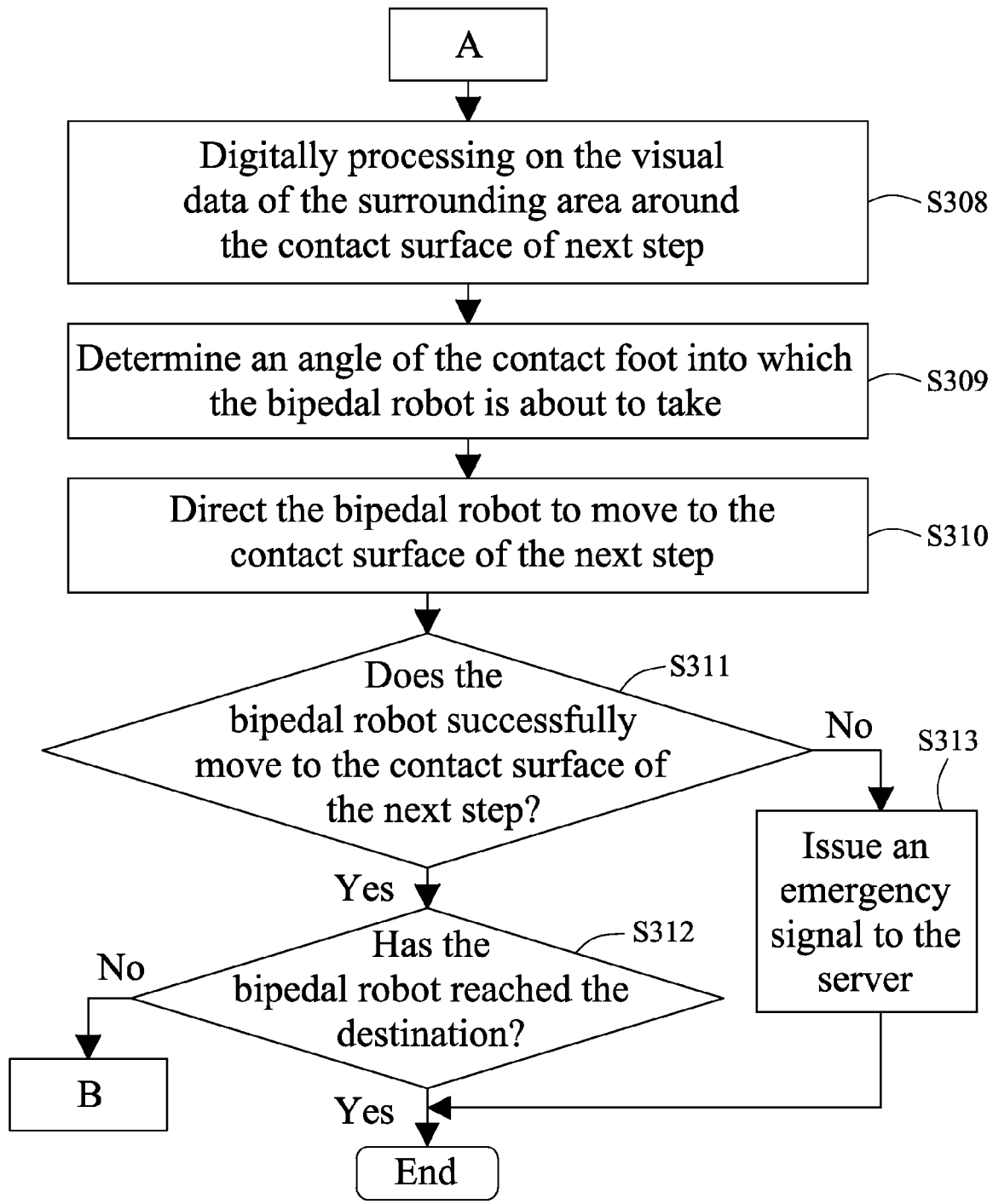

FIG. 3 is a flowchart of one embodiment of a method for controlling the bipedal robot 11 via the communication device 14. Depending on the embodiment, additional blocks may be added, others deleted, and the ordering of the blocks may be changed. In block S301, the acquisition module 210 acquires a current location of the bipedal robot 11 via the GPS 220.

In block S302, the configuration module 212 sets the destination location for the bipedal robot 1. In block S303, the acquisition module 210 acquires a map for the area through which the bipedal robot 11 is about to walk. It may be understood that the map is indicative of surrounding areas of the bipedal robot 11 between the current location of the bipedal robot and the destination location of the bipedal robot 11.

In block S302, the map processor module 211 applies digital processing to the map acquired by the acquisition module 210. As mentioned previously, in this embodiment, the digital processing applied includes converting the map to black and white, applying gridlines onto the map according to original resolution thereof, and determining the grayscale value of each grid by averaging grayscale values of the grid.

In block S305, the calculation module 213 determines the route from the current location to the destination location according to the map. In this embodiment, the route is determined according to the grayscale value of each grid on the map.

In block S306, the calculation module 213 determines the locations of all contact surfaces upon which the bipedal robot 11 is about to step according to the route. In this embodiment, the locations of all contact surfaces are determined according to the route, a distance between contact feet of the bipedal robot 11, and the size of each contact foot. A location of each contact foot, the location of the left contact foot and the location of the right contact foot, may be within a buffering range along the route. Additionally, the neighboring step distance of the left contact foot and the right contact foot may be less than the maximum range across which the bipedal robot may walk in only one step.

In block S307, the capture module 214 captures the visual data, via the camera device 230, of the surrounding area around the contact surface of the next step the bipedal robot 11 is about to take.

In block S308, the map processor module 211 applies the digital processing to the visual data of the surrounding area around the contact surface of the next step the bipedal robot is about to take. As mentioned previously, in this embodiment, the digital processing applied on the visual data of the surrounding area around the contact surface of the next step includes converting the visual data of the surrounding area around the contact surface of the next step to black and white, applying gridlines to the map according to the original resolution of the visual data, and determining the grayscale value of each grid by averaging the grayscale values of the grid.

In block S309, the calculation module 213 determines the angle of the contact foot of the next step the bipedal robot 11 is about to take according to the visual data of the surrounding area of the next surface. As mentioned, the angle of the contact foot of the next step is determined through determining the average of the grayscale values in the first half of a grid and the average of the grayscale values in the second half of the grid, determining the inclined angle of the surrounding area of the contact surface according to a difference between average grayscale value in the first half of the grid and the average grayscale value in the second half of the grid, and determining the angle of the contact foot of next step according to the inclined angle.

In block S310, the control module 215 directs the bipedal robot 11 to move to the contact surface of the next step according to the angle of the next contact foot.

In block S311, the determination module 216 determines if movement to the contact surface of the next step has been successful.

In block S312, the determination module 216 determines if the bipedal robot 11 has reached the destination location.

In block S313, if the bipedal robot 11 does not successfully move to the contact surface of the next step, the notification module 217 issues an emergency signal to the server 13, and the process is completed.

In block S314, the if the bipedal robot 11 does not reach the destination, the procedure in the block S307 is repeated. If the bipedal robot 11 reaches the destination, the process is completed.

It should be emphasized that the above-described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. A communication device for controlling a bipedal robot, the communication device embodied in the bipedal robot, the communication device comprising:
   a configuration module configured for receiving and setting a destination location of the bipedal robot;
   an acquisition module configured for acquiring mapping data indicative of surrounding areas of the bipedal robot from a memory system, the mapping data including surrounding areas between a current location of the bipedal robot and the destination location of the bipedal robot, wherein the current location of the bipedal robot is determined through use of a Global Positioning System (GPS) embodied in the communication device;
   a calculation module configured for determining a route from the current location to the destination location according to the mapping data, and determining contact surfaces upon which the bipedal robot steps according to the route;
   a control module configured for directing the bipedal robot to move step-by-step from the current location to the destination location according to the determined contact surfaces and the determined route;
   a capture module configured for using a camera device to capture visual data of a surrounding area around a contact surface of a next step of the bipedal robot;
   a map processor module configured for digitally processing the visual data of the surrounding area around the contact surface of the next step; and
   the calculation module further configured for determining an angle of a contact foot of the bipedal robot for the next step of the bipedal robot according to the visual data of the surrounding area around the contact surface of the next step, the control module further configured for directing the bipedal robot to move to the contact surface of the next step based on the angle of the contact foot of the next step; and
   at least one processor, the at least one processor executing the configuration module, the acquisition module, the calculation module, the control module, the capture module, and the map processor module.

2. The system as claimed in claim 1, wherein the map processor module is further configured for digitally processing the mapping data.

3. The system as claimed in claim 2, wherein digitally processing the mapping data comprises:
   converting the visual data of the mapping data to black and white;
   applying gridlines to the mapping data according to original resolution of the visual data of the mapping data; and
   determining a grayscale value of each grid by averaging grayscale values of the grid.

4. The system as claimed in claim 1, wherein the calculation module determines the angle of the contact foot of the next step by:
   determining an average of the grayscale values in a first half of a grid, and an average of the grayscale values in a second half of the grid;
   determining an inclined angle of the surrounding area around the contact surface of the next step according to a difference between the average of the grayscale values in the first half and the average of the grayscale values in the second half of the grid; and
   determining the angle of the contact foot of the next step according to the inclined angle.

5. A computer-implemented method for controlling a bipedal robot via a communication device embodied in the bipedal robot, the method comprising:
   registering a destination location of the bipedal robot on a map, wherein the destination location is user-selected;
   acquiring mapping data indicative of surrounding areas of the bipedal robot from a memory system, the mapping data including surrounding areas between a current location of the bipedal robot and the destination location of the bipedal robot, wherein the current location of the bipedal robot is determined through use of a Global Positioning System (GPS) embodied in the communication device;
   determining a route from the current location to the destination location according to the mapping data;

directing the bipedal robot to move step-by-step from the current location to the destination location according to the determined contact surfaces and the determined route;

using a camera device to capture visual data of a surrounding area around a contact surface for a next step of the bipedal robot;

digitally processing the visual data of the surrounding area around the contact surface of the next step; and determining an angle of a contact foot of the bipedal robot for the next step of the bipedal robot according to the visual data of the surrounding area around the contact surface of the next step; and directing the bipedal robot to move to the contact surface of the next step based on the angle of the contact foot of the next step.

6. The method as claimed in claim 5, wherein digitally processing the visual data of the surrounding area further comprises:

converting the visual data of the surrounding area around the contact surface of the next step to black and white;

applying gridlines to the visual data of the surrounding area according to original resolution of the visual data of the surrounding area around the contact surface of the next step; and determining a grayscale value of each grid by averaging grayscale values of the grid.

7. The method as claimed in claim 5, wherein determination of the angle of the contact foot of the next step further comprises:

determining an average of grayscale values in a first half of a grid, and an average of grayscale values in a second half of the grid;

determining an inclined angle of the surrounding area around the location of the next step according to a difference between the average of the grayscale values in the first half and the average of the grayscale values in the second half of the grid; and determining the angle of the contact foot of the next step according to the inclined angle.

8. The method as claimed in claim 5, wherein the method further comprises digitally processing the mapping data.

9. The method as claimed in claim 8, wherein digitally processing the mapping data comprises:

converting the visual data of the mapping data to black and white;

applying gridlines to the mapping data according to original resolution of the visual data of the mapping data; and determining a grayscale value of each grid by averaging grayscale values of the grid.

10. A non-transitory computer-readable medium, comprising, stored thereon, instructions that, when executed by a computer, cause the computer to perform a method for controlling a bipedal robot via a communication device embodied in the bipedal robot, the method comprising:

registering a destination location of the bipedal robot on a map, wherein the destination location is user-selected;

acquiring mapping data indicative of surrounding areas of the bipedal robot from a memory system, the mapping data including surrounding areas between a current location of the bipedal robot and the destination location of the bipedal robot, wherein the current location of the bipedal robot is determined through use of a Global Positioning System (GPS) embodied in the communication device;

determining a route from the current location to the destination location according to the mapping data;

directing the bipedal robot to move step-by-step from the current location to the destination location according to the determined contact surfaces and the determined route;

using a camera device to capture visual data of a surrounding area around a contact surface for a next step of the bipedal robot;

digitally processing the visual data of the surrounding area around the contact surface of the next step; and determining an angle of a contact foot of the bipedal robot for the next step of the bipedal robot according to the visual data of the surrounding area around the contact surface of the next step; and directing the bipedal robot to move to the contact surface of the next step based on the angle of the contact foot of the next step.

11. The computer-readable medium as claimed in claim 10, wherein digitally processing on the visual data of the surrounding area further comprises:

converting the visual data of the surrounding area around the contact surface of the next step to black and white;

applying gridlines to the visual data of the surrounding area according to original resolution of the visual data of the surrounding area around the contact surface of the next step; and determining a grayscale value of each grid by averaging the grayscale values of the grid.

12. The computer-readable medium as claimed in claim 10, wherein determination of the angle of the contact foot of the next step further comprises:

determining the average of grayscale values in a first half of a grid, and the average of grayscale values in a second half of the grid;

determining an inclined angle of a surrounding area around the location of the next contact foot according to a difference between the average of the grayscale values in the first half and the average of the grayscale values in the second half of the grid; and determining the angle of the contact foot of the next step according to the inclined angle.

13. The computer-readable medium as claimed in claim 10, wherein the method further comprises digitally processing the mapping data.

14. The computer-readable medium as claimed in claim 13, wherein application of digital processing on the mapping data comprises:

converting the visual data of the mapping data to black and white;

applying gridlines to the mapping data according to original resolution of the visual data of the mapping data; and determining a grayscale value of each grid by averaging grayscale values of the grid.

* * * * *